United States Patent
Moore et al.

(10) Patent No.: US 11,739,033 B2
(45) Date of Patent: Aug. 29, 2023

(54) FERTILIZER COATING APPLIED IN THE REDUCTION OF CAKING AND MOISTURE ADSORPTION

(71) Applicant: Arr-Maz Products, L.P., Mulberry, FL (US)

(72) Inventors: Lucas R. Moore, Dover, FL (US); Christina Konecki, Lakeland, FL (US)

(73) Assignee: Arr-Maz Products, L.P., Mulberry, FL (US)

( * ) Notice: Subject to any disclaimer, the term of this patent is extended or adjusted under 35 U.S.C. 154(b) by 36 days.

(21) Appl. No.: 16/689,400

(22) Filed: Nov. 20, 2019

(65) Prior Publication Data

US 2020/0157019 A1     May 21, 2020

Related U.S. Application Data

(60) Provisional application No. 62/769,841, filed on Nov. 20, 2018.

(51) Int. Cl.
 *C05G 5/30* (2020.01)
 *C05G 3/30* (2020.01)
 (Continued)

(52) U.S. Cl.
 CPC ............... *C05G 5/37* (2020.02); *C05G 3/30* (2020.02); *C05G 5/12* (2020.02); *C05G 5/30* (2020.02);
 (Continued)

(58) Field of Classification Search
 None
 See application file for complete search history.

(56) References Cited

U.S. PATENT DOCUMENTS

| | | | | |
|---|---|---|---|---|
| 3,336,155 A | * | 8/1967 | Rowe ...................... | C05G 3/00 |
| | | | | 427/212 |
| 4,089,800 A | * | 5/1978 | Temple ................... | A61K 9/50 |
| | | | | 427/213.31 |

(Continued)

FOREIGN PATENT DOCUMENTS

| | | | | |
|---|---|---|---|---|
| JP | 05163091 A | * | 6/1993 | ............... C05G 5/37 |
| JP | 08059382 A | * | 3/1996 | ............... C05G 5/37 |

(Continued)

OTHER PUBLICATIONS

Chilean Patent Office; Search Report and Written Opinion; dated Jul. 14, 2022.

*Primary Examiner* — Wayne A Langel
(74) *Attorney, Agent, or Firm* — Head, Johnson, Kachigian & Wilkinson, PC

(57) ABSTRACT

An active chemistry capable of being combined with a carrier to produce a coating for fertilizer or other granular or compacted products, where the coating is capable of being applied at ambient temperature and is capable of reducing moisture adsorption and caking of the granular product. The active chemistry may be a functionalized polymer such as maleic anhydride/acid (from maleic anhydride), itaconic acid, diisobutylene, methacrylic acid, alkyl acrylates (i.e. butyl acrylate), hydroxyl ethyl methacrylate, 2-acrylamido-2-methyl propane sulfonic acid, 3-allyloxy-1,2-propanediol acrylic acid, acrylamide, or a combination thereof.

11 Claims, 3 Drawing Sheets

(51) Int. Cl.

| | | |
|---|---|---|
| *C05G 5/12* | (2020.01) | |
| *C08L 91/06* | (2006.01) | |
| *C08F 210/14* | (2006.01) | |
| *C08L 91/00* | (2006.01) | |
| *C08F 222/06* | (2006.01) | |
| *C09D 123/00* | (2006.01) | |
| *C09D 191/00* | (2006.01) | |

(52) U.S. Cl.
CPC .......... *C08F 210/14* (2013.01); *C08F 222/06* (2013.01); *C08L 91/005* (2013.01); *C08L 91/06* (2013.01); *C09D 123/00* (2013.01); *C09D 191/00* (2013.01)

(56) References Cited

U.S. PATENT DOCUMENTS

| | | | | |
|---|---|---|---|---|
| 4,610,311 A * | 9/1986 | Bronner | ................... | C05G 3/80 |
| | | | | 252/607 |
| 5,405,426 A * | 4/1995 | Timmons | ................. | C05G 5/36 |
| | | | | 71/28 |
| 5,466,274 A * | 11/1995 | Hudson | .................... | C05G 5/36 |
| | | | | 71/28 |
| 5,589,577 A * | 12/1996 | Peltonen | ............. | C08B 37/0057 |
| | | | | 536/22.1 |
| 5,628,813 A * | 5/1997 | Chen | ........................ | C05G 5/30 |
| | | | | 71/64.02 |
| 5,631,045 A * | 5/1997 | Yaniv | ...................... | C04B 41/83 |
| | | | | 427/221 |
| 6,287,359 B1 * | 9/2001 | Erhardt | .................... | C05G 5/37 |
| | | | | 71/64.07 |
| 8,192,520 B2 * | 6/2012 | Sanders | ................... | C05D 3/02 |
| | | | | 71/31 |
| 10,294,170 B2 * | 5/2019 | Obrestad | ................... | B01J 2/30 |
| 11,124,462 B1 * | 9/2021 | Hocking | ................. | C07F 9/224 |
| 2002/0148388 A1 | 10/2002 | Varnadoe et al. | | |
| 2003/0033843 A1 * | 2/2003 | Tabei | ....................... | C05G 5/37 |
| | | | | 71/64.02 |
| 2003/0220200 A1 * | 11/2003 | Wertz | ........................ | C05C 9/02 |
| | | | | 504/327 |
| 2004/0226330 A1 * | 11/2004 | Sanders | ................... | C05G 5/37 |
| | | | | 71/33 |
| 2005/0172858 A1 * | 8/2005 | Schonherr | .............. | A23K 30/15 |
| | | | | 106/287.24 |
| 2006/0141010 A1 * | 6/2006 | Karl | ........................... | C05G 5/37 |
| | | | | 424/442 |
| 2010/0011825 A1 * | 1/2010 | Ogle | .......................... | C05G 5/36 |
| | | | | 71/30 |
| 2010/0326152 A1 * | 12/2010 | Mente | ...................... | C05G 5/37 |
| | | | | 71/27 |
| 2014/0033779 A1 * | 2/2014 | Bertin | ..................... | C05C 9/005 |
| | | | | 71/64.07 |
| 2014/0137616 A1 | 5/2014 | Peacock et al. | | |
| 2015/0210603 A1 * | 7/2015 | Du | ........................... | C05G 5/37 |
| | | | | 71/28 |
| 2016/0297725 A1 * | 10/2016 | No | .......................... | C05C 9/005 |
| 2016/0340266 A1 * | 11/2016 | Jablon | ...................... | C05G 5/37 |
| 2017/0283339 A1 | 10/2017 | Obrestad et al. | | |
| 2018/0022661 A1 * | 1/2018 | Achille | ..................... | C05G 5/36 |
| | | | | 71/27 |
| 2019/0048214 A1 * | 2/2019 | Horsting | ................. | C09D 7/41 |
| 2019/0135650 A1 * | 5/2019 | Singh | ..................... | D21H 19/36 |

FOREIGN PATENT DOCUMENTS

| | | |
|---|---|---|
| JP | 09249478 | 9/1997 |
| MX | 2018010308 | 11/2018 |
| WO | 9915480 | 4/1999 |
| WO | 2017184952 | 10/2017 |

\* cited by examiner

FERTILIZER COATING APPLIED IN THE REDUCTION OF CAKING AND MOISTURE ADSORPTION

CROSS REFERENCE

This application is based on and claims priority to U.S. Provisional Patent Application No. 62/769,841 filed Nov. 20, 2018.

BACKGROUND OF THE INVENTION

Field of the Invention

This invention relates generally to fertilizer coatings, and more particularly, but not by way of limitation, to an active chemistry in a carrier forming a fertilizer coating that can be applied at ambient temperature, without heating the coating or fertilizer, and that is effective in reducing both caking and moisture adsorption.

Description of the Related Art

Fertilizers and other granular products (i.e. LDAN) are generally hygroscopic. This is necessary to ensure dissolution of the product and allow the uptake of nutrients and micronutrients therein by the plants to which the product is applied. Such products are not mechanical devices, however, allowing this hygroscopic property to be turned on as needed. Therefore, such products will adsorb moisture out of the air prior to application. This is especially problematic in the more humid regions like Florida, Brazil, etc. where the temperature and humidity can become quite high.

As a consequence of moisture adsorption, fertilizers can slowly dissolve and re-precipitate as the natural humidity fluctuates through the day. This process causes the fertilizers to lose shape, size, and even begin building mass and size by interactions with other granules. This is especially problematic for nitrate-based granules/fertilizers, which is even further exaggerated by the combination with other granule types. For example, calcium nitrate has a critical relative humidity of 46.7, but this will be lowered to 23.5 when combined with ammonium nitrate, which is independently at 59.4.

Today, coatings are applied that assist with building a layer around the granule to prevent the uptake of moisture. In most cases, this requires elevated heat (~85 deg C.) to obtain a melted product that can be spread over the granule surfaces. This poses a problem for those who are handling ambient temperature granules, such as those in NPK blenders and warehouses. In those cases, the heated coating will come into contact with the cool granule and solidify, leading to clumping and other issues if not aggressively mixed.

Based on the foregoing, it is desirable to provide an active chemistry for a fertilizer coating that reduces moisture adsorption that can be applied at room temperature, without the need for heating the coating or aggressive mixing.

It is further desirable for such a coating to additionally offer the benefit of reducing caking of the fertilizer or other granules to which the coating is applied.

SUMMARY OF THE INVENTION

In general, in a first aspect, the invention relates to an active component of a coating for granular or compacted products, the active component comprising a functionalized polymer. The functionalized polymer may be a copolymer or a tertpolymer. The functionalized polymer may comprise styrene, acrylic acid, maleic anhydride/acid (from maleic anhydride), itaconic acid, diisobutylene, methacrylic acid, alkyl acrylates (i.e. butyl acrylate or alkyl acrylate), hydroxyl ethyl methacrylate, 2-acrylamido-2-methyl propane sulfonic acid, 3-allyloxy-1,2-propanediol acrylic acid, acrylamide, other monomers, or a combination thereof. Specifically, the functionalized polymer may comprise maleic anhydride/acid and diisobutylene. The molecular weight of the active component may be 2000 to 500,000 Daltons.

The active component may be combined with a carrier to produce a coating. The functionalized polymer may be combined with the carrier at a concentration of 0-100%, but more specifically at 10-30% and more specifically still at 15%. In other cases, the functionalized polymer can be combined with more traditional active components such as phosphate esters, carboxylic acids, and fatty amines, etc., more specifically 7.5% functionalized polymer and 7.5% stearyl acid and stearyl amine (50/50). The carrier may be paraffin wax, paraffin oil, raffene oil, bright stock, rerefined base oils, base oils, petroleum-based oil, or a combination thereof. The resultant coating may be pumpable at ambient temperature.

The coating may be applied to a granular, crystalline, or compacted product to reduce moisture adsorption of the granular or compacted product. The coating may be heated, but may not be heated prior to coating the granular product with the coating. The granular product may be fertilizer.

Figure 1:
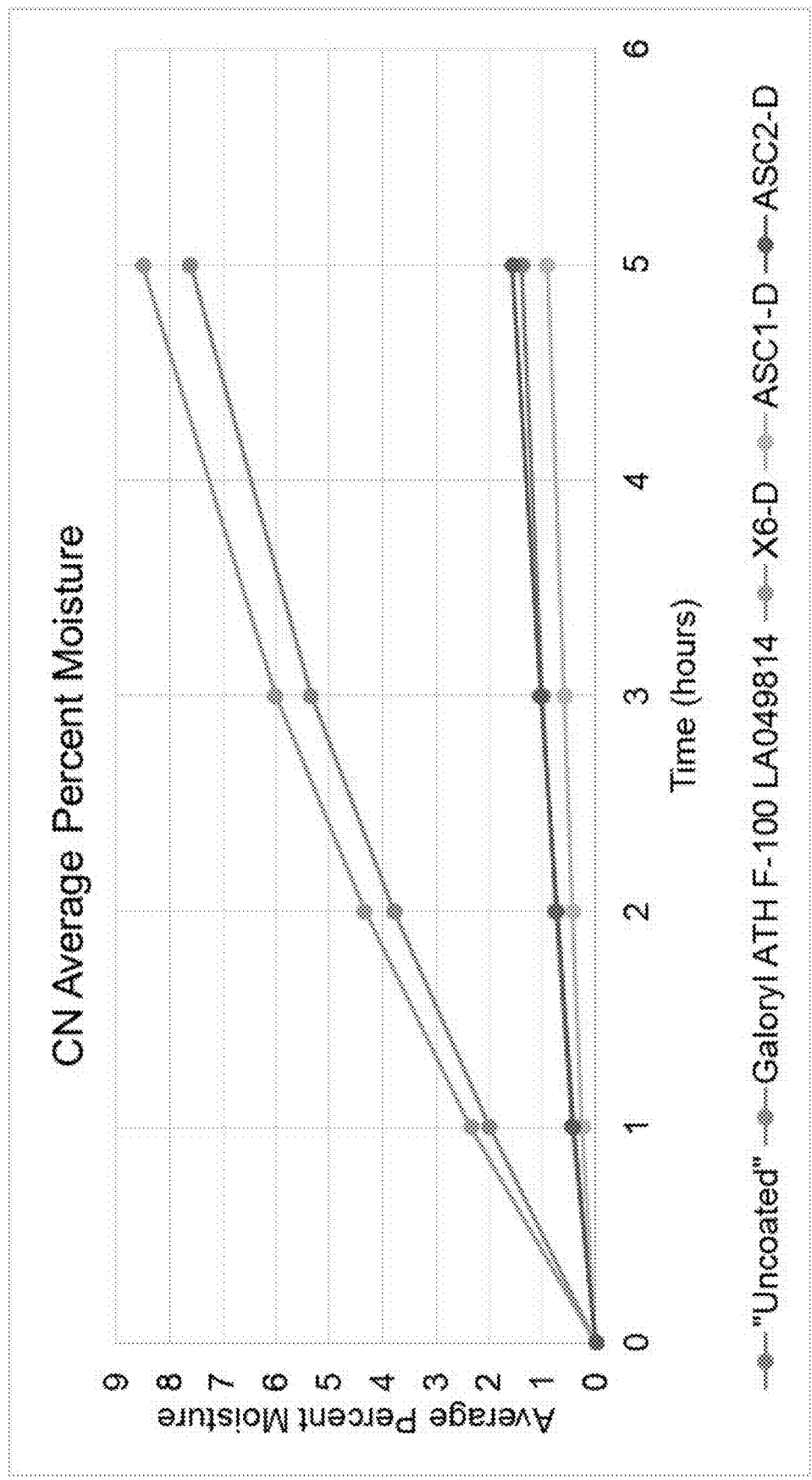
FIG. 1 is a chart showing the average percent moisture of fertilizers with various coatings.
Figure 2:
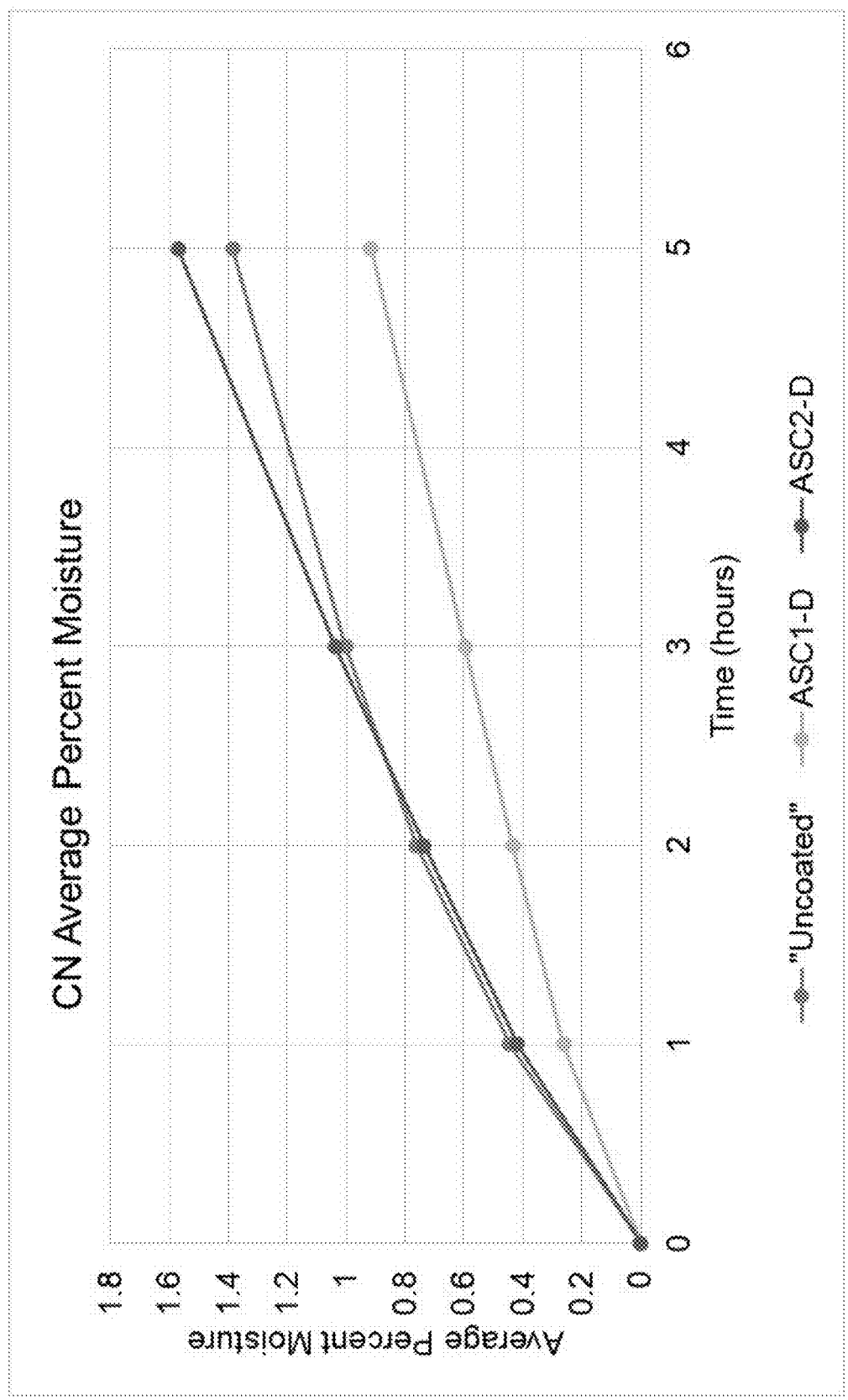
FIG. 2 is a chart showing the average percent moisture of fertilizers with various coatings.
Figure 3:
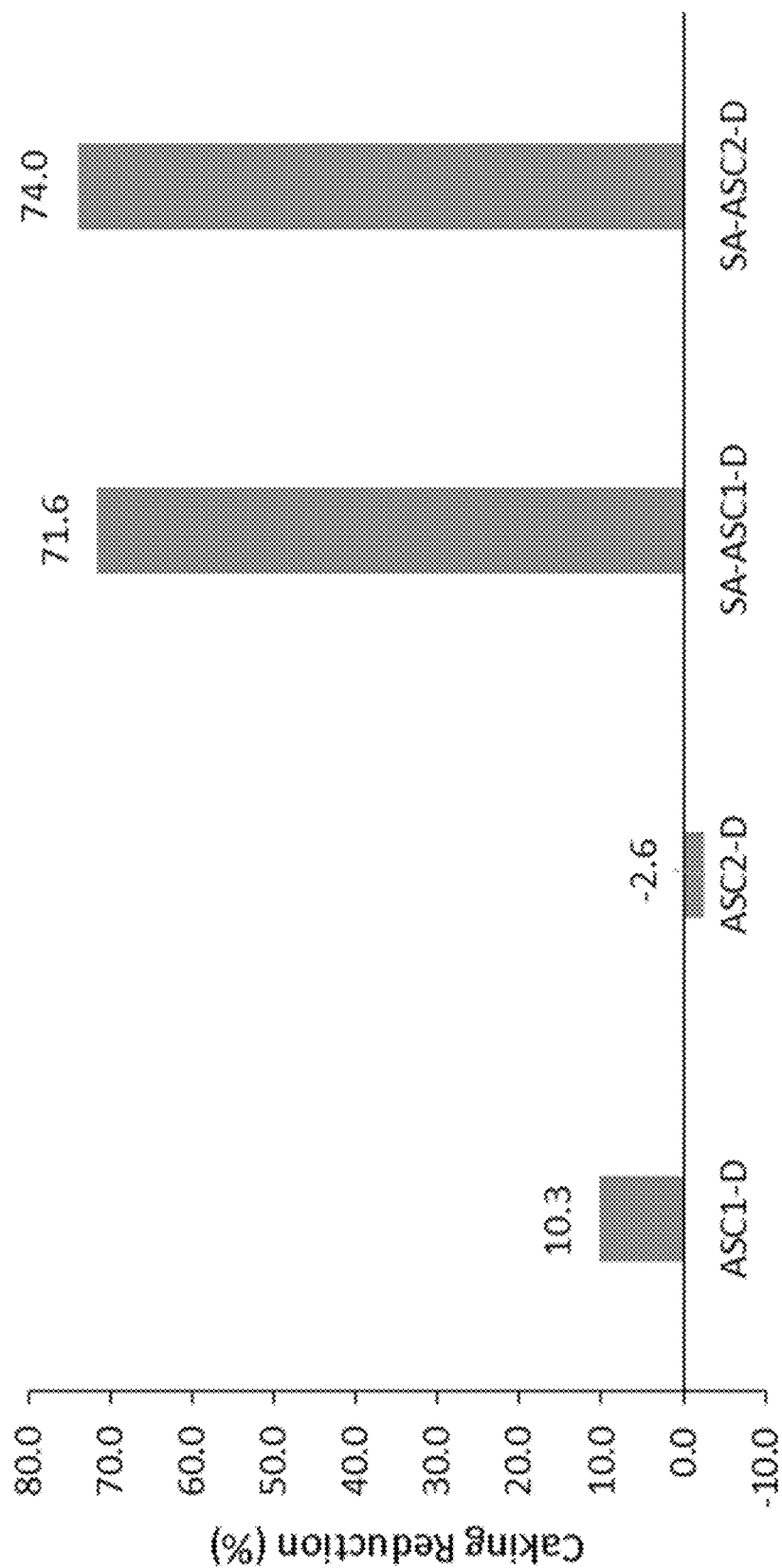
FIG. 3 is a chart showing the percent reduction in caking with various coatings.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to an active chemistry for a coating for fertilizer or other granular or compacted products that can be applied at room temperature, that reduces moisture adsorption, and that reduces caking of the product.

The active chemistry may be a polymeric dispersant and/or antiscalent-type chemistry. The functionalized polymer may be used alone or in combination with one or more traditional anticaking chemistries, including but not limited to stearyl amines, stearic acid, phosphate esters, etc. The traditional anticaking chemistries may be alkyl or alkoxylated phosphate esters, fatty carboxylic acid, fatty amines, or combinations thereof. The dispersants/antiscalents may be polymer in nature and at least a copolymer, if not a tert-polymer. This polymer may be a solution, an emulsion, or neat. The base chemistry of the polymer may be either one or a combination of maleic anhydride/acid (from maleic anhydride), itaconic acid, diisobutylene, methacrylic acid, alkyl acrylates (i.e. butyl acrylate), hydroxyl ethyl methacrylate, 2-acrylamido-2-methyl propane sulfonic acid, 3-allyloxy-1,2-propanediol acrylic acid, acrylamide, styrene, acrylic acid, ethyl acrylate, and salts of acids such as ammonium, sodium, potassium, calcium, etc.

The active chemistry may be combined with any traditional or nontraditional carrier to produce the coating. The carrier may include, but is not limited to, paraffin wax, paraffin oil, raffene oil, bright stock, rerefined base oils, base oils, or petroleum-based oils. The molecular weight of the active chemistry may be 2000 to around 500,000 Daltons, preferably 15,000 to 30,000 Daltons.

The combination of the active chemistry with the carrier may provide a novel solution to the reduction of moisture adsorption by hygroscopic granules or hygroscopic compacted products, such as those found in fertilizers and LDAN. It is able to do so without the requirement of heating the coating, which is an industrial need. Based on what is known in the industry, this should have a significantly favorable impact on the caking tendencies of the fertilizer.

EXAMPLE

A polymer chemistry consisting of maleic anhydride/acid and diisobutylene at a molecular weight of 17,000 Daltons was combined at a concentration of 15% with a carrier consisting of 77% rerefined base oil and 23% bright stock (ASC1-D). The resulting stable coating was easily pumpable at ambient temperature. A second coating was prepared by combining 15% of a polymer chemistry consisting of acrylic acid and methacrylic acid at a molecular weight of 4500 Daltons with a carrier consisting of 77% rerefined base oil and 23% bright stock (ASC2-D). The resulting stable coating was likewise easily pumpable at ambient temperature.

During testing, calcium nitrate coated with ASC1-D was able to reduce moisture uptake by 43% and maintain the resistance to moisture uptake to a minimum of 34% for the course of five hours, relative to uncoated fertilizer. This material also reduced the clumping or caking tendencies of the calcium nitrate.

Example 1

Following the below temp/humidity profile, ASC1-D yielded a 41% reduction in moisture uptake within the first hour, thus preventing the dissolution or moisture contamination of the calcium nitrate granule. ASC2-D also yielded a reduction in moisture uptake, but only 6% during the one hour.

Conditions:

| Relative Humidity | 42% |
| Temperature | 30° C. |
| Coating Rate | 2 kg/MT |

Results:

| Moisture Reduction (%) | | |
| --- | --- | --- |
| Time (h) | ASC1-D | ASC2-D |
| 0 | 0.00 | 0.00 |
| 1 | −41.38 | −6.00 |
| 2 | −43.10 | −3.44 |
| 3 | −40.53 | 3.50 |
| 5 | −33.89 | 13.37 |

Example 2

Following the same temp/humidity profile, two variations were also prepared of an active pack blend with steryl acid and steryl amine with the polymer chemistry. In this case, the new products yielded significant moisture uptake, which was 654% and 710% moisture gain at its highest. This adds mass and dilutes the calcium nitrate components. However, these components also disrupted the recrystallization process more effectively, thus reducing the caking by 72 and 74%, which is quite significant. A 10.3% reduction is observed with the ASC1-D. So, this combination of coatings will allow for a blender to decide if moisture gain, and thus nutrient dilution, is more important, or if caking is more important.

Conditions:

| Relative Humidity | 42% |
| Temperature | 30° C. |
| Coating Rate | 2 kg/MT |

Results:

| Moisture Reduction (%) | | |
| --- | --- | --- |
| Time (h) | SA-ASC1-D | SA-ASC2-D |
| 0 | 0 | 0 |
| 1 | 531.8 | 556.6 |
| 2 | 596.0 | 620.0 |
| 3 | 630.6 | 671.2 |
| 4 | 654.0 | 709.9 |

Whereas, the devices and methods have been described in relation to the drawings and claims, it should be understood that other and further modifications, apart from those shown or suggested herein, may be made within the spirit and scope of this invention.

What is claimed is:

1. A coating for granular products, the coating comprising:
   a functionalized polymer, where the functionalized polymer is a solution and where the functionalized polymer comprises maleic anhydride/acid and diisobutylene; and
   a carrier, where the carrier is paraffin oil, raffene oil, bright stock, rerefined base oil, base oil, petroleum-based oil, or a combination thereof;
   where the coating is pumpable at ambient temperature.

2. The coating of claim 1 where the functionalized polymer is a copolymer or block polymer.

3. The coating of claim 1 where the functionalized polymer is a tertpolymer.

4. The coating of claim 1 where the functionalized polymer is combined with the carrier at a concentration of 10-30%.

5. The coating of claim 1 where the molecular weight of the functionalized polymer is 2000 to 500,000 Daltons.

6. A method of reducing moisture adsorption in a granular or compacted product, the method comprising:
   combining a functionalized polymer with a carrier to produce a coating, where the functionalized polymer is a solution; the functionalized polymer comprises maleic anhydride/acid and diisobutylene; and the carrier is paraffin oil, raffene oil, bright stock, rerefined base oil, base oil, petroleum-based oil, or a combination thereof and where the coating is pumpable at ambient temperature; and
   coating a granular or compacted product with the coating, where the coating is not heated prior to coating the granular or compacted product with the coating.

7. The method of claim 6 where the functionalized polymer is a copolymer.

8. The method of claim 6 where the functionalized polymer is a tertpolymer.

9. The method of claim 6 where the functionalized polymer is combined with the carrier at a concentration of 10-30%.

10. The method of claim 6 where the molecular weight of the functionalized polymer is 2000 to 500,000 Daltons.

11. The method of claim 6 where the granular product is fertilizer.

\* \* \* \* \*